United States Patent [19]
Somers

[11] 4,368,934
[45] Jan. 18, 1983

[54] STORAGE CABINET FOR CASSETTES BOXES

[75] Inventor: Giles N. Somers, Geneva, Switzerland

[73] Assignee: Claire Corporation AG, Zoug, Switzerland

[21] Appl. No.: 170,671

[22] PCT Filed: Mar. 16, 1979

[86] PCT No.: PCT/CH79/00042

§ 371 Date: Nov. 21, 1979

§ 102(e) Date: Nov. 20, 1979

[87] PCT Pub. No.: WO79/00804

PCT Pub. Date: Oct. 18, 1979

[30] Foreign Application Priority Data

Mar. 21, 1978 [CH] Switzerland ............... 3085/78
Mar. 9, 1979 [CH] Switzerland ............... 2288/79

[51] Int. Cl.³ .................................. A47B 81/06
[52] U.S. Cl. .............................. 312/13; 312/14; 312/246; 206/387
[58] Field of Search ............ 312/8, 9, 11, 13, 246, 312/14, 13; 248/205 A, 467; 206/387; 211/40

[56] References Cited

U.S. PATENT DOCUMENTS

| | | | |
|---|---|---|---|
| 1,172,754 | 2/1916 | Wilkinson et al. | 312/13 |
| 3,265,453 | 8/1966 | Seide | 312/13 |
| 3,489,475 | 1/1970 | Boyce et al. | 312/14 |
| 3,603,478 | 9/1971 | Connan | 206/387 |
| 3,613,895 | 10/1971 | Larkin | 211/40 |
| 3,627,398 | 12/1971 | Reese | 312/246 |
| 3,763,994 | 10/1973 | Somers | 206/387 |
| 3,880,535 | 4/1975 | Durham et al. | 248/205 A |
| 3,897,885 | 8/1975 | Joyce | 206/387 |
| 3,909,088 | 9/1975 | Dennehey et al. | 206/387 |
| 4,054,344 | 10/1977 | Fujimoto et al. | 206/387 |

FOREIGN PATENT DOCUMENTS

| | | | |
|---|---|---|---|
| 2702824 | 1/1977 | Fed. Rep. of Germany | 248/205 A |
| 772347 | 10/1934 | France | 312/13 |
| 1343761 | 10/1963 | France | 211/40 |
| 2180811 | 11/1973 | France . | |
| 2198210 | 3/1974 | France . | |
| 958689 | 5/1964 | United Kingdom | 312/13 |
| 1075738 | 7/1967 | United Kingdom | 312/13 |
| 1451923 | 10/1976 | United Kingdom | 211/40 |
| 1503568 | 3/1978 | United Kingdom . | |

*Primary Examiner*—Victor N. Sakran
*Attorney, Agent, or Firm*—Young & Thompson

[57] ABSTRACT

It is desired to simplify the problem of putting cassettes in order and to extract cassettes, and to avoid throwing away the standard cassette boxes.

The cabinet can hold cassette boxes (5) such as the standard type of cassette boxes in regular commercial use. Swinging components (3) swinging on an axis (4) hold the boxes (5). Each component (3), in its rest position is held in place by a disengageable lug. Cabinets (1) can be connected together in a row by grooves (10) and ribs (11) in dove-tail form. A cover (2) can be fixed removably by means of projections (12) which engage in the grooves (13). The cover can serve as a handle. The cover can receive a cabinet superimposed on the first one by removable connection means (14, 15).

4 Claims, 26 Drawing Figures

STORAGE CABINET FOR CASSETTES BOXES

The invention relates to a storage cabinet intended to hold at least two cassette boxes side by side.

To arrange cassettes a solution presently known particularly from U.S. Pat. No. 3,763,994 consists in providing parallelipipedic cases enclosing a flap on which a cassette is held, the flap or cradle being able to swing outside the body of the case to permit the cassette to be taken off or put back. The cases usually incorporate removable securing means allowing them to be lined up in rows.

A disadvantage of this solution is that one is obliged to throw away the standard box which is sold by the shop with the cassette, the cassette being placed directly on the flap, which is a waste. Furthermore, if one wants to identify the cassette which has been installed, it is necessary to provide the special case with a label because it is not generally possible to use the combined label and index card which are usually placed inside the standard box in which a cassette is sold.

Obviously, one can be content with simply placing the standard boxes containing cassettes in a simple carrying case or valise which avoids throwing away the boxes and uses the label-inlay card, but this elementary solution plainly does not provide the advantages of the first mentioned solution, according to which the special cases with swing-out flaps are assembled in rows and which give direct access to the cassettes. When using a valise, one first of all has to open this, then extract a box and take the cassette out of it with both hands, which is far more complicated.

The aim of the present invention is to provide a solution giving most the advantages of the special cases but allowing nevertheless to keep the standard boxes, for example the cassette box according to German Pat. No. 1,300,864 to avoid the wastage of throwing it away and to simplify the label identification and allow the arranging of the cassettes in rows each in its original box.

According to the invention the cabinet for cassette boxes intended to receive at least two boxes side by side comprises a coffer (open case) which is open on at least one face to permit access to the boxes and it is characterized in that it incorporates on the side of the open access face at least one component which pivots around an axis, each of these components holding a box or as a variation a pair of boxes. Such a solution was in no way obvious in view of the known realisations.

The invention will be easier to understand by means of the description of several embodiments given by way of example and in referring to the drawing on which.

Figures 1, 2:
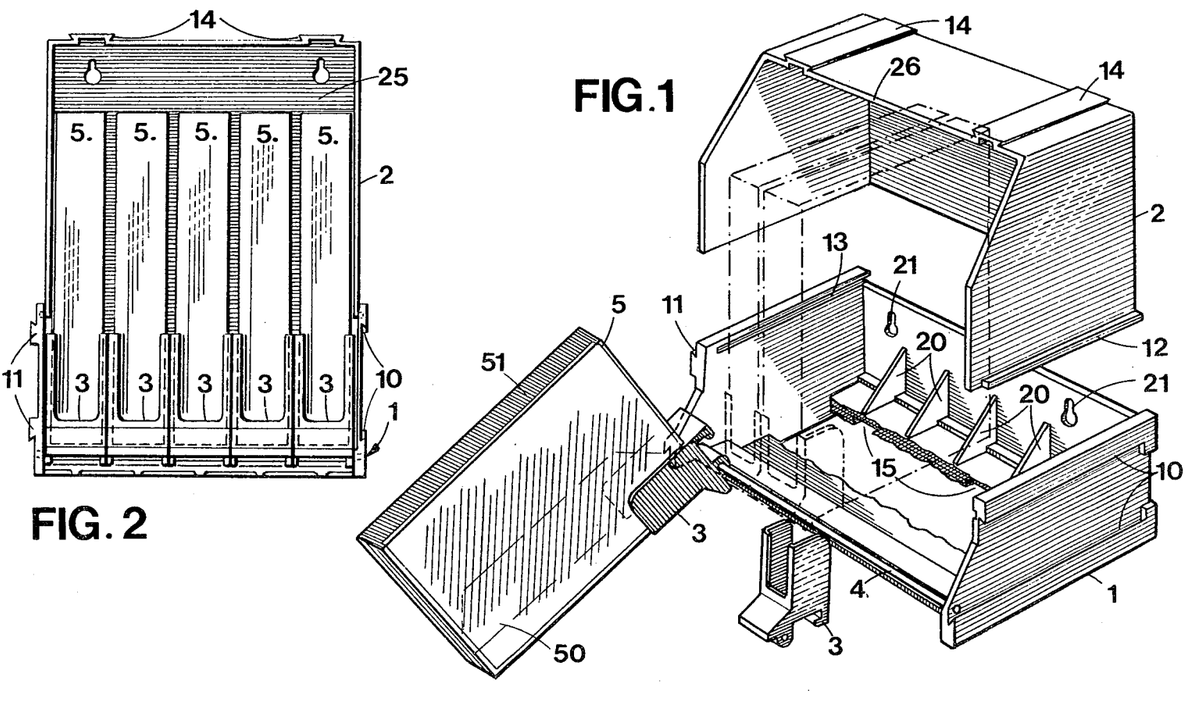
FIG. 1 represents a perspective view of a first embodiment of the cabinet, certain parts being disassembled.
FIG. 2 is a front view of the cabinet of FIG. 1.

The cabinet shown in FIG. 1 consists of a coffer 1 which can hold a series of cassette boxes arranged in a row of which two are shown in dashed lines. Ribs 20 separate the adjacent boxes to position each box in its place and avoid that two adjacent boxes interfere a with one another. As is shown in FIG. 2 the illustrated open case 1 is designed for five boxes and includes a row of five pivoting components 3, hereafter called box holders which are placed side by side on a common axis 4. Each box holder grips a box in the region of an end part of the long narrow face 55 of the fixed part 50 (FIG. 5) of box 5.

The coffer 1 includes on its rear surface bayonnette openings 21 visible in FIG. 1 which permit it to be easily fixed in a removable manner on a wall. The coffer is also provided with means for removably fixing it onto adjacent coffers by grooves 10 intended to slide into dove-tails 11 of the adjacent coffer.

Figure 4:
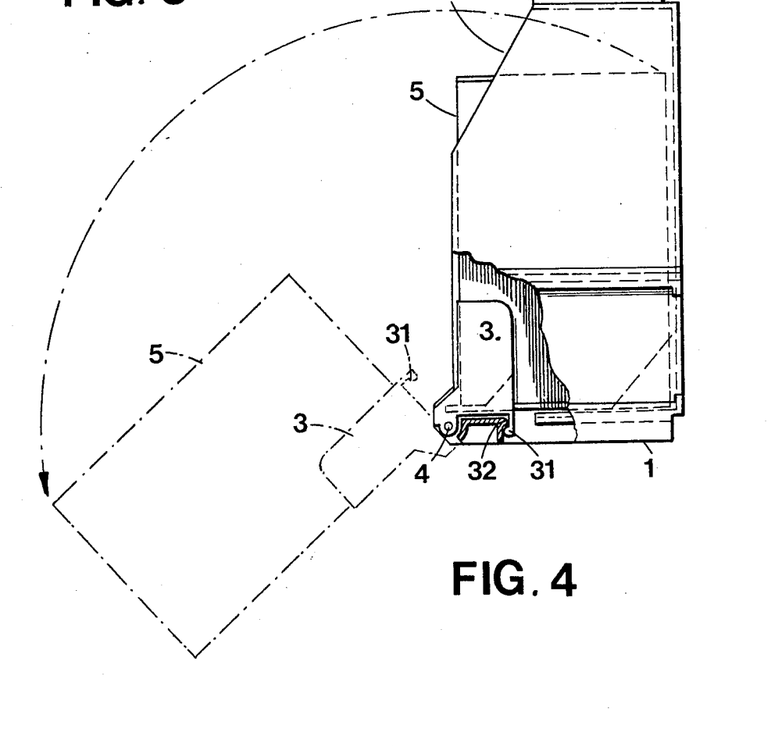
FIG. 4 is a side view of the cabinet of FIG. 1.

The coffer includes means for removably connecting it to a cover 2, in the form of grooves 13 intended to fit with projections 12 of the cover 2. On the upper surface of the cover, removable connection means are provided which permit slidably to superimpose another coffer, these means comprising projections 14 intended to fit with a dove-tail grooves 15 provided in the bottom wall of a coffer. One can see that the cover 2 leaves a space 25 above the row of boxes. This space provides the distance required to rotate a box as shown in FIG. 4. The cover 2 can be used as a sort of handle to hold a cabinet or even a row of cabinets, the space 25 leaving sufficient room for the fingers. The edge 26 is inset in relation to the front face of the cabinet giving access to the boxes, to improve the balance when one uses the cover as a handle. The cover is an optional accessory. In a variation it can be an integral part of the coffer 1.

Figure 3:
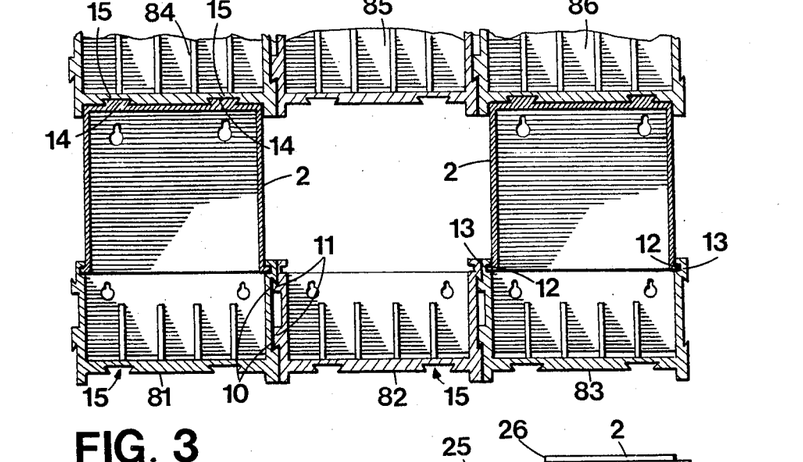
FIG. 3 shows an arrangement of several cabinets joined together removably.

FIG. 3 illustrates the use of these means for removably connecting coffers together to create an assembly consisting of a row of three coffers 81, 82, 83; the covers are not necessary to create such a row. The coffers 81, and 83 are each completed by a cover 2 which permits the joining together of an upper row comprising coffers 84, 85, 86. The thicknesses are exaggerated to make the means of removable connection 10, 11, 12, 13, 14 and 15 more clearly visible. One notes that the covers penetrate partially into the base of the superimposed coffers 84, 86, which contributes to the rigidity of the assembly.

As is shown in FIG. 4 the boxes 5 fixed onto the box holders 3 are held in a rest position inside the coffer 1 by means of a projection 32 which cooperates with a lug 31 of the box holder. This arrangement prevents a box from swinging out too easily. But this arrangement also presents another advantage. When a box holder is pivots outwards, it is overhanging and has a tendency to pull out the axis towards the exterior. This could dismount the axis if it did not have the provision of lug 31 and projection 32 of the adjacent box holders. In fact, thanks to this arrangement, the box holders situated each side of a box holder that has been swung outwards hold the axis 4 because they are held in place by their lugs and thus play the role of fixed bearings next to the swung-out box holder. The axis is for example a simple metal rod or pin.

Figures 5, 13:
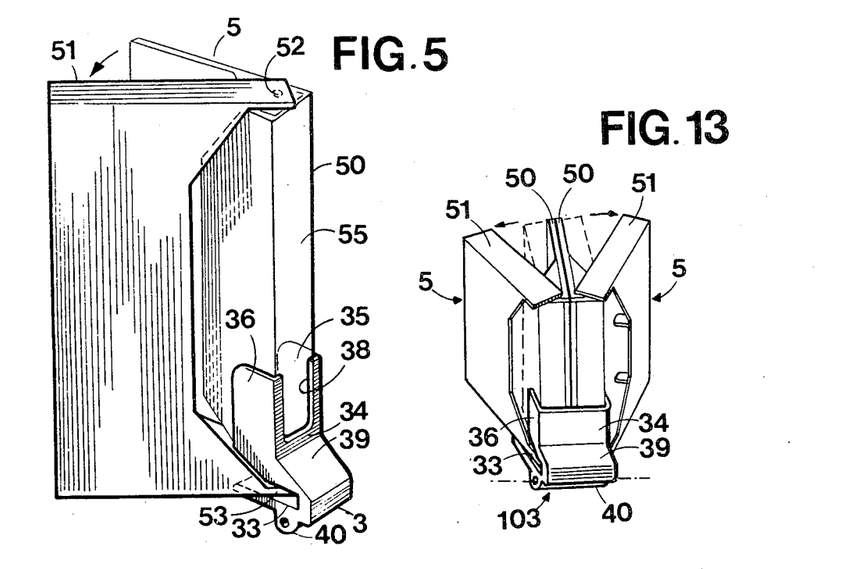
FIG. 5 shows the fitting of a box onto a swinging component or "box holder"
FIG. 13 shows a double swinging box holder.

The box 5 shown in these examples is a standard cassette box similar to that shown in German Pat. No. 1,300,864. As is shown in FIG. 5, the box consists essentially of a fixed part 50 receiving the cassette and a movable part 51 articulated on the first part like a cover by means of projections 52 and 53. The box holder 3 is attached to the fixed part 50 in an area at the extremity of the long narrow face 55. The box holder has a section in the general from of a U, the upright parts of the U consisting of lateral walls 35 and 36 and the central part of the U consisting of the wall 34. Wall 34 has an opening 38 the object of which is to leave visible the largest part of face 55 that is possible. Part 50 is almost always made of a transparent material to permit the label information to be read through the long narrow face 55, also the inlay card to be read through the other faces. It is therefore desirable that the box holder covers these faces as little as possible, particularly face 55 of the part made of transparent material. This is the reason for the opening 38 in the wall 34 of the box holder which thus permits the major part of the long face 55 to be visible. Another solution consists in making the box holder entirely out of transparent material such as polycarbonate or polystyrene.

On wall 36 a slot 33 is provided to permit the extension 53 to pass when one opens the box. A raised part 39 supports a bearing 40 which is designed to cooperate with the axle 4.

Figure 6:
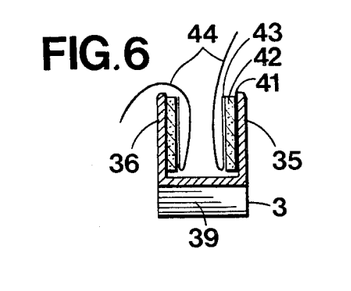
FIGS. 6 and 7 are sectional views of two embodiments of a swinging box holder.

FIGS. 6 to 10 illustrate means to assure the adhering of the box holder to the cassette box. In FIG. 6 the lateral walls 35 and 36 of the box holder 3 have on their internal faces a certain thickness of foamed plastic material 42 fixed to the wall by an adhesive. On the opposite face of the foamed plastic material in an adhesive 43 covered by a protective tape 44. When one installs a box on the box holder it is placed between the walls 35 and 36 while keeping the ends of the tapes 44 outside. When the box is in its correct position inside the box holder the tapes 44 are pulled so that they uncover the adhesive 43 which fixes the box to the box holder. The thickness of the foam 42 takes up the slight dimensional differences between boxes of different makes.

Figure 7:
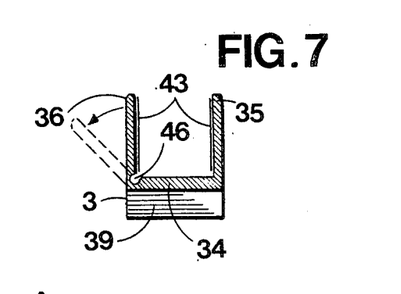

In FIG. 7, wall 36 is connected to wall 34 by a hinge 36 to make it easier to introduce the box into the box holder. This can also compensate for small dimensional variations.

Figure 8:
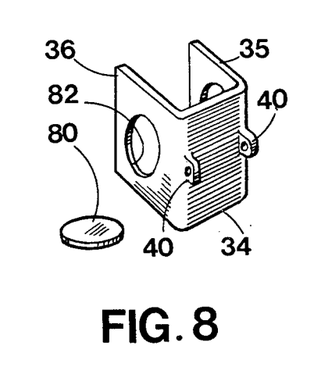
FIG. 8 shows another embodiment of a swinging box holder.

FIG. 8 represents a box holder of a different type designed to cooperate with the central part of the long narrow face 55 of the box. Preferably this box holder is made of a transparent plastic material. To insure the fixing of the box holder to the box, openings 82 are arranged in the lateral faces 35 and 36 and pastilles 80 are foreseen to be inserted in the openings and stuck to the box. The shape of the pastille will correspond at least partially to the outline of the opening 82. The opening 82 can be slightly conical, the pastille thus having a corresponding conicity.

Figure 9:
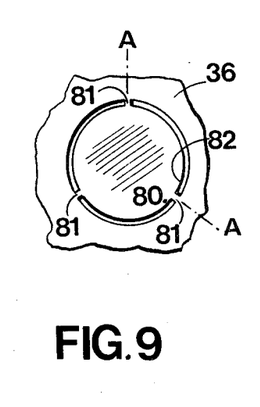
FIG. 9 illustrates a detail of a swinging box holder.
Figure 10:
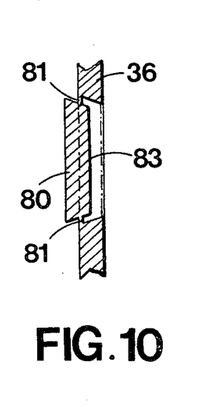
FIG. 10 is a section along A—A of FIG. 9.

FIGS. 9 and 10 illustrate a variation where pastille 80 is held in the opening by bridges 81; this arrangement permits the pastille to be injection molded in one piece with the box holder instead of forming a separate piece.

The pastille is situated slightly proud of the exterior face of the lateral wall of the box holder and has the ahesive on its interior face. When one installs a box in the box holder, at the moment when the box is in its correct place one fixes it there by pressing from the exterior onto the pastilles 80, which breaks the bridges 81 and permits the pastille to adhere to the box by its internal face due to the adhesive.

The adhesive of the pastille can consist of a piece of "double-face" adhesive tape with adhesive applied to both sides and preferably the adhesive is protected by a detachable protective tape for example in siliconised paper or in polyethylene. The pastilles are not necessarily circular nor are the corresponding openings.

Figure 11:
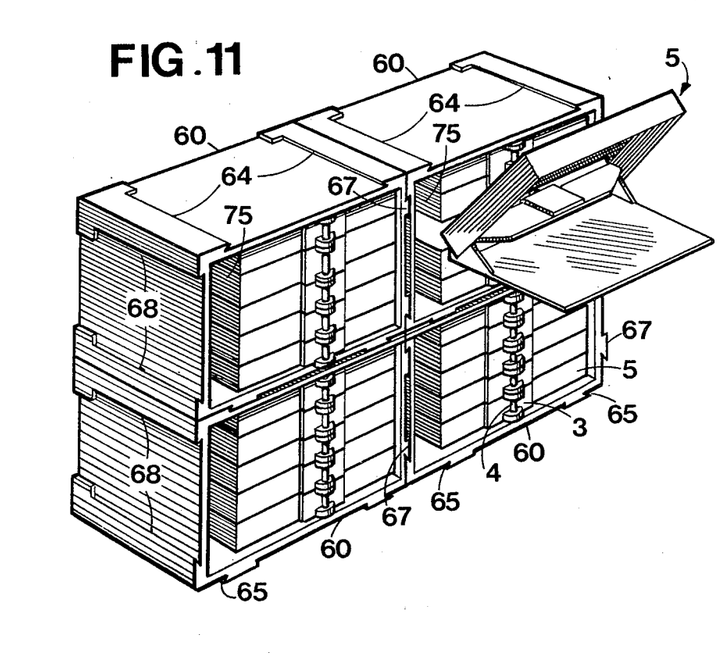
FIG. 11 represents in perspective another form of a cabinet.
Figure 12:
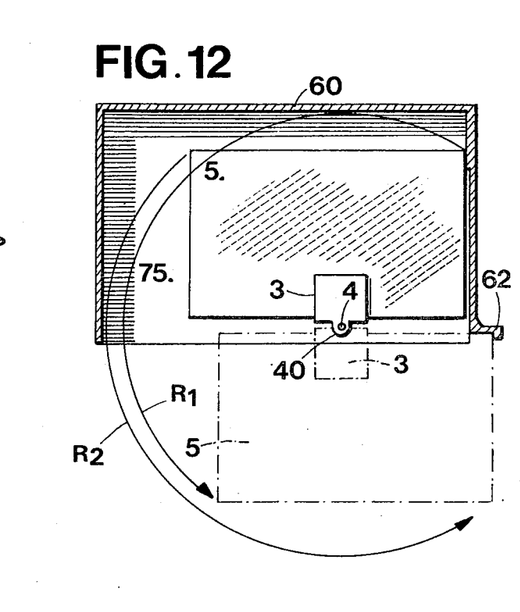
FIG. 12 illustrates a functional detail of the cabinet shown in FIG. 11.

One will understand that the different means of fixing described above in reference to FIGS. 6 and 10 can concern either a box holder designed to be fixed in position on the extremity of the long narrow face 55 as in FIGS. 1 to 5, or a box holder designed to be fixed in a midway position as illustrated in FIGS. 11 and 12.

FIG. 11 shows another embodiment of the cabinet. The coffer 60 surrounds on its four sides the row of boxes and is thus not intended to accept a cover. Each coffer is provided with removable connection means allowing the coffers to be assembled together horizontally and vertically. For this purpose, the groove 68 are formed to receive projections 67, and grooves 64 are formed to receive projections 65.

It should be noted that an opening 75 is provided to allow the rotation of the box.

FIG. 12 illustrates a means provided to facilitate the positioning of a box in the instance where the box holder is designed to cooperate with the middle area of the long narrow face 55. A stop 62 positions the box at the time of its being fixed to the box holder in the position shown with dashed lines. The arcs R1 and R2 indicate the space which must be left free so that the box can swing. The arc R1 sweeps the space 75 and the arc R2 sweeps in particular the space between the bottom of the cabinet 60 and the box 5, R1 is not the same as R2 because the box holder 3 is slightly off center in relation to box 5.

Regarding the box holder of one or the other type, one can equally well forsee a double box holder designed to hold two boxes 5 which swing out together. In this case of course the moving parts 51 of the boxes must thus be placed towards the outer sides of the pair thus constituted, as is shown in FIG. 13, for a double box holder 103.

It is of course understood that by the term of "box holder" is meant to apply to all components pivoting about an axis such as 4 and on which will be positioned and fixed by adhesion one or two cassette boxes.

Figure 14:
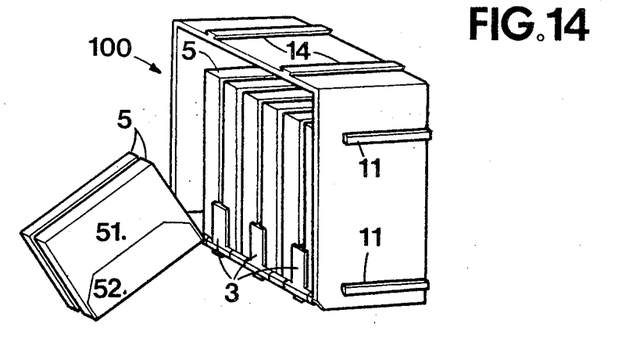
FIG. 14 is a general view of another form of cabinet.

The cabinet 100 in FIG. 14 provides for four pairs of boxes 5 and includes for this purpose four pivioting components 3 each of which holds a pair of boxes 5. As one can see for the component 3 which is in an open position, the boxes are positioned with the flap part 51 visible. Nevertheless the opposite position is equally well forseeable and the two arrangements are described below.

The cabinet illustrated includes ribs in dove-tail form 11 on the lateral face and corresponding grooves, not visible in FIG. 14, on the opposite face. The dove-tail ribs 11 and the grooves constitute removable connection means permitting the assembly of several cabinets in a row.

The cabinet illustrated also includes upper ribs 14 and corresponding dove-tail slots on the lower face, not visible in FIG. 14. These ribs and these slots constitute removable connection permitting several cabinets to be superimposed.

Figure 15:
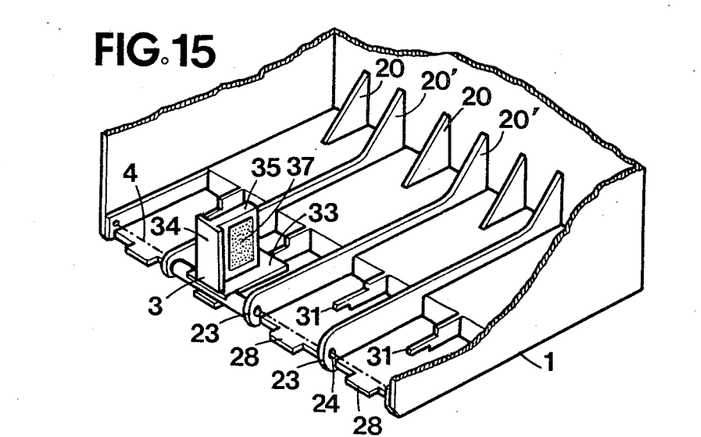
FIG. 15 shows the bottom of the coffer (open case) of the cabinet, with a pivoting component, certain parts being removed.

FIG. 15 shows, with cut-away sections, the bottom of a cabinet. It includes ribs 20, 20' adapted to separate adjacent boxes by wedging each box in its place and prevent two boxes next to each other from interfering with each other. The swinging components 3 of which one only is illustrated in FIG. 15 pivot on an axle 4 and are articulated to the cabinet on feet 23 provided with openings 24 for the axle 4. In front of each swinging component 3 there is a projection 31 intended to cooperate with a lug 32 (FIGS. 16 and 18) on the swinging component 3 to hold it releasably in the rest or closed position. In front of and below each swinging component there is another projection 28 forming a stop and intended to limit opening of the swinging component to the position shown in FIG. 14.

Figure 16:
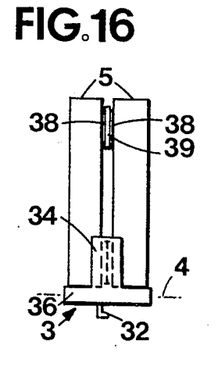
FIGS. 16 to 18 illustrate the fixing of a pair of boxes onto a pivoting component.
Figures 17, 18:
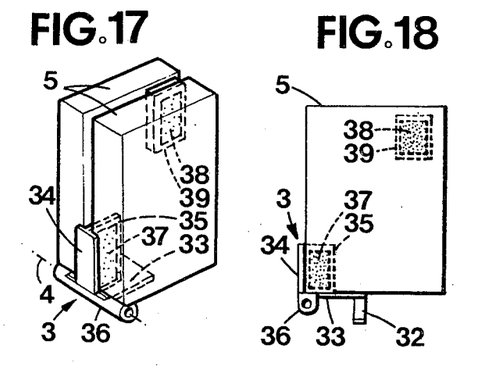

As is shown in FIGS. 16 to 18, each swinging component has a base plate 33 and a median plate 35 projecting perpendicular from the middle of the base plate 33, the swinging component having thus the general shape of a T. The swinging component shown includes furthermore a frontal plate 34. The three plates 33, 34, 35 outline two trihedral trirectangles each intended to receive the corner of a box 5, as is shown in FIGS. 16 to 18. The boxes 5 are fixed to the swinging component by an adhesive area 37 on each face of the central plate 35. The adhesive area consists preferably of a piece of double-faced adhesive tape stuck on one side onto the plate 35, its other side remaining covered with a protective foil which can be removed at the time that one wishes to fix it onto a box.

An independant auxilliary plate 39 provided with adhesive 38 on each side, is intended to insure a supplementary fixing together of two boxes forming a pair.

Figure 19:
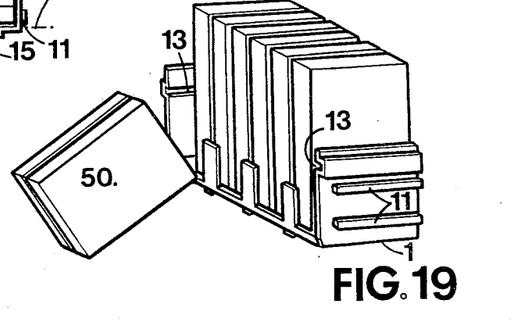
FIG. 19 illustrates another embodiment of the cabinet

The cabinet in FIG. 19 includes a coffer part 1 where the swinging components are in place. One of the swinging components is shown in open position and the boxes are arranged with the part holding the cassette 50 having its large face towards the exterior. But they can also be arranged as in FIG. 14. The coffer comprises slidable connection means 11 allowing rows of cabinets to be built.

The coffer can have a cover 2 (FIG. 20) and includes for this purpose grooves 13 intended to cooperate with the corresponding ribs 12 on the cover 2. The cover 2 can be used as a kind of handle, the space above the boxes leaving sufficient room for the fingers. The edge 26 is inset in relation to the front face, which gives access to the boxes, to improve the balance when one uses the cover as a handle. Furthermore, the bayonnette openings 21 should be noted which allow the cover to be fixed removably against a wall. Naturally, similar openings can equally well be provided on the lower part of the back wall of the coffer 1 or on the lower wall of the cabinet in FIG. 14.

Figure 21:
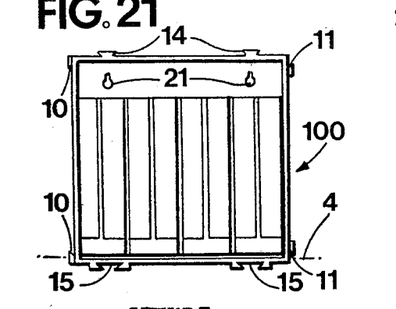
FIG. 21 shows an embodiment of the cabinet comprising different pivoting components from those illustrated in the preceeding figures.
Figure 22:
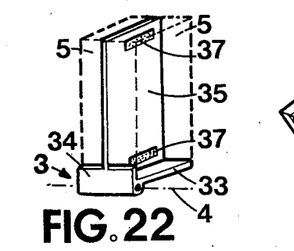
FIG. 22 shows a pivoting component of the cabinet shown in FIG. 20, FIGS. 23 and 24 illustrate a first means of placing a pair of boxes on a pivoting component.

The cabinet in FIG. 21 includes swinging components which are different from those in the previous figures. As is shown in FIG. 22 they are characterized by a central plate 35 which has similar dimensions to one large side face of a box which makes it superfluous to use an auxilliary intermediary fixing plate. A relatively large central plate 35 permits a better fixing of the boxes 5. Here each face of the plate has two adhesive areas 37.

Figure 20:
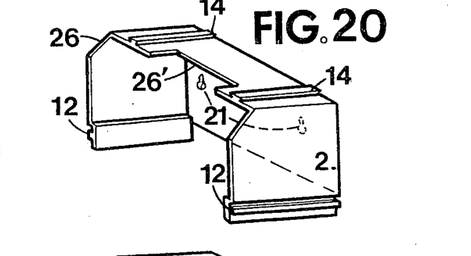
FIG. 20 shows a removable cover.

On FIGS. 20 and 21, upper ribs 14 can be noted which are intended to cooperate with corresponding dove-tails and on FIG. 21 the dove-tails 15 which allow identical cabinets to be superimposed. Also the ribs 11 and dove-tail grooves 10 should be noted, which allow several cabinets to be assembled in a row.

Figure 23:
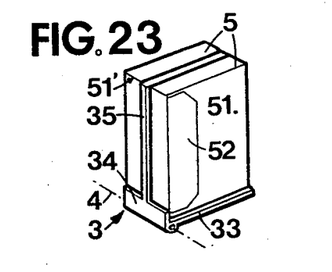
Figure 24:
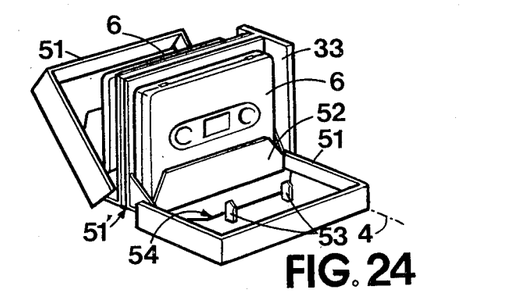

In FIG. 23 the boxes 5 are fixed with their flaps 51 towards the outside. The edge 52 of the part which holds the cassette can be seen, this part being generally transparent whereas the flap is often opaque. In FIG. 24 the swinging component is shown in its open position and the flap 51 and two boxes 5 are open, thus giving access to the cassettes 6. An opening 54 is provided in the flap 51 to accept the retaining edge 52 when the cassette 6 cooperates with the projections 53 to prevent the hubs of the cassette from turning.

Figure 25:
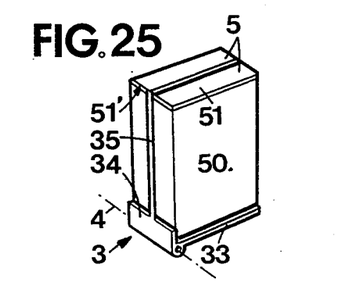
FIGS. 25 and 26 show a second means of placing a pair of boxes on a pivoting component.
Figure 26:
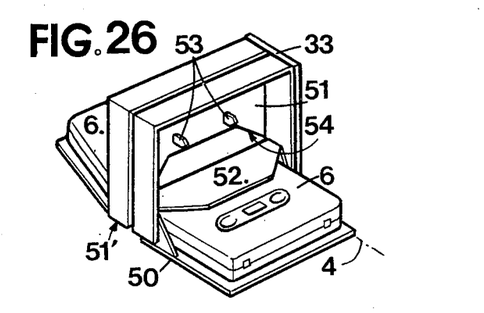

In FIG. 25 the boxes are held in position by their flaps 51 these being situated on the inside. The back of the part 50 which houses the cassette can be noted. In FIG. 26 the swinging component is shown in its open position and the housing parts 50 are pivoted to the flaps, and the cassettes 6, disengaged from the projections 53 which prevent the hubs from turning, are thus accessible.

To facilitate the understanding of FIGS. 23 to 26, on each figure the position of the edge 51' has been indicated in one of its extreme positions of oscillation or swinging around the axis 4.

The disposition shown in FIGS. 23 and 24 is usually preferred, as the cassette 6 does not have the tendency to slide out of its housing when the box is open.

I claim:

1. Coffer for cassette boxes of the type comprising two parts pivotally mounted one on the other, a first one of these parts comprising means for retaining a cassette on it and the second one forming a cover for closing the cassette box, said coffer comprising at least one swinging member having means for cooperating with the said first part of at least one cassette box, for maintaining said first part on said swinging member, means defining a rotation axis for at least one such swinging member on the coffer, the said axis being located so that the swinging member is movable between a first position where a cassette box retained on it is retracted into the coffer, and a second position where said cassette box is entirely out of the coffer and openable for introducing and removing the cassette without separating the box from the swinging member, each said swinging member being arranged for receiving and retaining the said first part of a pair of cassette boxes, back to back with their covers openable on two opposite sides.

2. Coffer according to claim 1, in which each swinging member has in sectional view the shape of a T, and means for attaching the said first part of a cassette box on each side of the middle branch of the T.

3. Coffer for cassette boxes of the type comprising two parts pivotally mounted one on the other, a first one of these parts comprising means for retaining a cassette on it and the second one forming a cover fo closing the cassette box, said coffer comprising at least one swinging member having means for cooperating with the said first part of at least one cassette box, for maintaining said first part on said swinging member, means defining a rotation axis for at least one such swinging member on the coffer, the said axis being located so that the swinging member is movable between a first position where a cassette box retained on it is retracted into the coffer, and a second position where said cassette box is entirely out of the coffer and openable for introducing and removing the cassette without separating the box from the swinging member, for use with a cassette box of the type in which said first part has a major face of a length and width substantially equal to the length and width of the cassette box, a minor face parallel to and spaced from said major face and of a length substantially equal to the length of the cassette box but of a width substantially less than the width of the cassette box, and an edge perpendicular to and interconnecting said major and minor faces and of a length substantially equal to the length of the cassette box and of a width substantially equal to the thickness of the cassette box, said cover of the cassette box comprising three edges at right angles to each other which, with said edge of said first part, complete a rectangular outline of the cassette box, said cover having a face secured to said three edges and disposed in the plane of said minor face of said first part when the cover is closed and of a size and shape which, with said minor face, completes a rectangular face of the cassette box which is parallel to and opposite and of substantially the same length and width as said major face of said first part of the cassette box, said swinging member having a U-shaped portion comprising a pair of parallel lateral walls interconnected by a central wall, said cassette box being receivable in said swinging member with said major and minor walls of said first part in contact with lateral walls of said U-shaped portion of said swinging member and said edge of said first part in contact with said central wall of said U-shaped portion, said lateral wall of said U-shaped portion that contacts said minor face of said first part overlying only said minor face of said first part whereby said cover is free to swing open.

4. Coffer according to claim 3, in which said swinging member has a portion that partially underlies one said edge of said cover of a said cassette box, said underlying portion of said swinging member having a lug that extends downwardly in the closed position of the swinging member and that engages in said closed position with a snap action with a projection on the coffer thereby releasably to retain the swinging member in closed position.

* * * * *